US012591395B2

(12) United States Patent
Ma et al.

(10) Patent No.: US 12,591,395 B2
(45) Date of Patent: Mar. 31, 2026

(54) METHOD AND DEVICE AND STORAGE MEDIUM FOR CONTROLLING READ/WRITE STRATEGY BASED ON FULLNESS DIFFERENCE BETWEEN READ AND WRITE QUEUES

(71) Applicant: Smarter Silicon (Shanghai) Technologies Co., Ltd., Shanghai (CN)

(72) Inventors: Zexi Ma, Shanghai (CN); Feng Li, Shanghai (CN)

(73) Assignee: Smarter Silicon (Shanghai) Technologies Co., Ltd., Shanghai (CN)

( * ) Notice: Subject to any disclaimer, the term of this patent is extended or adjusted under 35 U.S.C. 154(b) by 0 days.

(21) Appl. No.: 18/778,510

(22) Filed: Jul. 19, 2024

(65) Prior Publication Data

US 2025/0028446 A1      Jan. 23, 2025

(30) Foreign Application Priority Data

Jul. 20, 2023    (CN) .......................... 202310897118.8

(51) Int. Cl.
*G06F 3/06*           (2006.01)
(52) U.S. Cl.
CPC ............ G06F 3/0659 (2013.01); G06F 3/061 (2013.01); G06F 3/0673 (2013.01)

(58) Field of Classification Search
CPC ....... G06F 3/0659; G06F 3/061; G06F 3/0673
See application file for complete search history.

(56) References Cited

U.S. PATENT DOCUMENTS

2007/0016726 A1*    1/2007  Zohar  ................... G06F 3/0653
                                                          711/E12.089

* cited by examiner

*Primary Examiner* — Chie Yew
(74) *Attorney, Agent, or Firm* — ANOVA LAW GROUP, PLLC

(57)                ABSTRACT

A memory control method includes obtaining data parameters in a read queue and a write queue, updating a read/write control strategy according to the first detection result and the second detection result to obtain an updated read/write control strategy, and controlling subsequent read/write operations of a memory according to the updated read/write control strategy. The data parameters correspond to a first detection result of a quantity of data in the read queue and a second detection result of a quantity of data in the write queue. The first detection result is related to a degree of a fullness state of the read queue, and the second detection result is related to a degree of a fullness state of the write queue.

16 Claims, 3 Drawing Sheets

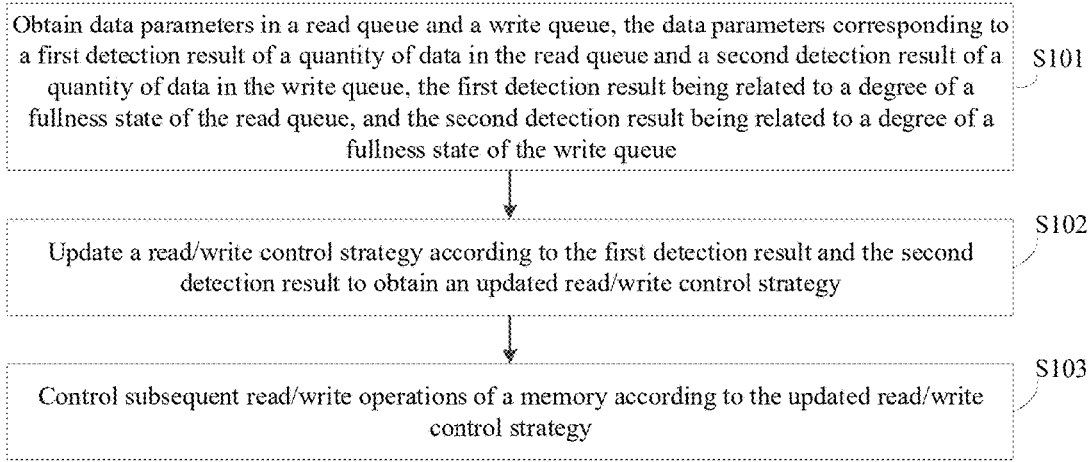

Obtain data parameters in a read queue and a write queue, the data parameters corresponding to a first detection result of a quantity of data in the read queue and a second detection result of a quantity of data in the write queue, the first detection result being related to a degree of a fullness state of the read queue, and the second detection result being related to a degree of a fullness state of the write queue    S101

Update a read/write control strategy according to the first detection result and the second detection result to obtain an updated read/write control strategy    S102

Control subsequent read/write operations of a memory according to the updated read/write control strategy    S103

FIG. 1

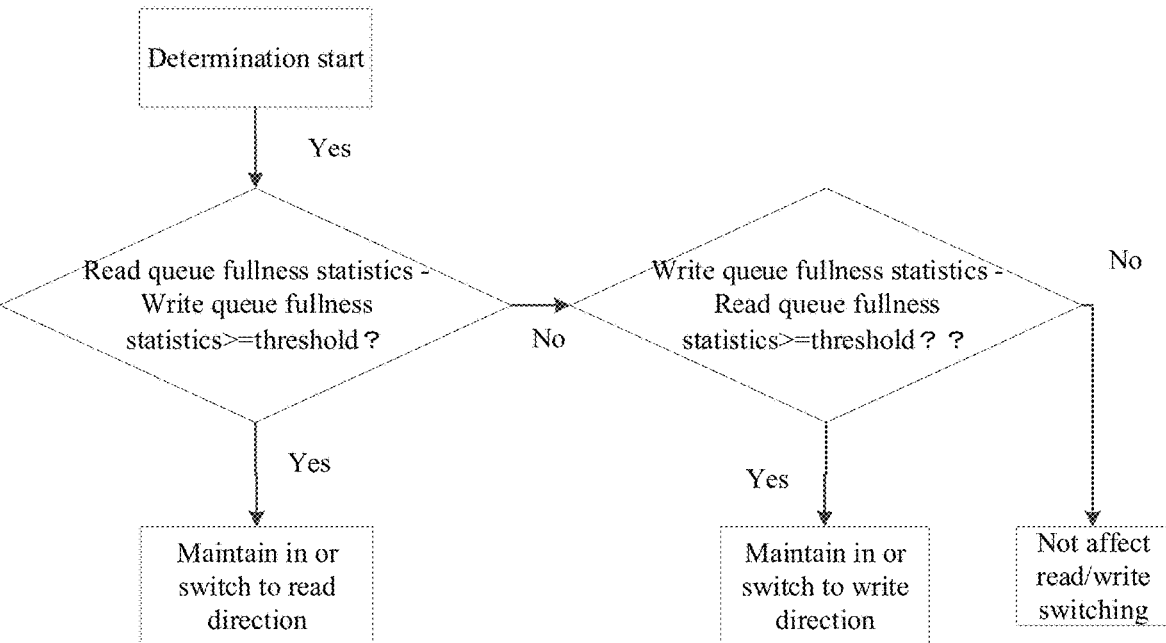

Determination start

Yes

Read queue fullness statistics - Write queue fullness statistics>=threshold ?

No

Write queue fullness statistics - Read queue fullness statistics>=threshold ? ?

No

Yes

Yes

Maintain in or switch to read direction

Maintain in or switch to write direction

Not affect read/write switching

FIG. 2

METHOD AND DEVICE AND STORAGE MEDIUM FOR CONTROLLING READ/WRITE STRATEGY BASED ON FULLNESS DIFFERENCE BETWEEN READ AND WRITE QUEUES

CROSS-REFERENCE TO RELATED APPLICATION

The present disclosure claims priority to Chinese Patent Application No. 202310897118.8, filed on Jul. 20, 2023, the entire content of which is incorporated herein by reference.

TECHNICAL FIELD

The present disclosure relates to the storage device technology field and, more particularly, to a storage device control method, a storage device control device, and a storage medium.

BACKGROUND

When controlling a dynamic random access memory (DRAM), a double data rate (DDR) controller is responsible for switching a read/write direction to perform a read operation and a write operation, respectively. If the controller remains in the read direction longer, more read operations are executed. If the controller remains in the write direction longer, more write operations are executed.

Often, the write operation and the read operation are switched according to the time length of performing the write/read operation or the quantity of the instructions performed by the read/write operation. According to such write/read switching methods, a quantity ratio between the read instructions performed by the DDR controller and the read instructions that are expected to process and a quantity ratio between the write instructions performed by the DDR controller and the write instructions that are expected to process are not balanced. For example, the performance of reading/writing data is degraded.

SUMMARY

A first aspect of the present invention provides a memory control method. The method includes obtaining data parameters in a read queue and a write queue, updating a read/write control strategy according to the first detection result and the second detection result to obtain an updated read/write control strategy, and controlling subsequent read/write operations of a memory according to the updated read/write control strategy. The data parameters correspond to a first detection result of a quantity of data in the read queue and a second detection result of a quantity of data in the write queue. The first detection result is related to a degree of a fullness state of the read queue, and the second detection result is related to a degree of a fullness state of the write queue.

A second aspect of the present invention provides a memory control device including one or more processors and one or more memories. The one or more memories store computer instructions that, when executed by the one or more processors, cause the one or more processors to obtain data parameters in a read queue and a write queue, update a read/write control strategy according to the first detection result and the second detection result to obtain an updated read/write control strategy, and control subsequent read/write operations of a memory according to the updated read/write control strategy. The data parameters correspond to a first detection result of a quantity of data in the read queue and a second detection result of a quantity of data in the write queue. The first detection result is related to a degree of a fullness state of the read queue, and the second detection result is related to a degree of a fullness state of the write queue.

A third aspect of the present invention provides a computer-readable storage medium storing a computer program that, when executed by one or more processors, causes the one or more processors to obtain data parameters in a read queue and a write queue, update a read/write control strategy according to the first detection result and the second detection result to obtain an updated read/write control strategy, and control subsequent read/write operations of a memory according to the updated read/write control strategy. The data parameters correspond to a first detection result of a quantity of data in the read queue and a second detection result of a quantity of data in the write queue. The first detection result is related to a degree of a fullness state of the read queue, and the second detection result is related to a degree of a fullness state of the write queue.

BRIEF DESCRIPTION OF THE DRAWINGS

FIG. 1 illustrates a schematic flowchart of a storage device control method according to some embodiments of the present disclosure.

FIG. 2 illustrates a schematic flowchart of a hardware replacement method according to some embodiments of the present disclosure.

DETAILED DESCRIPTION OF THE EMBODIMENTS

Figure 3:
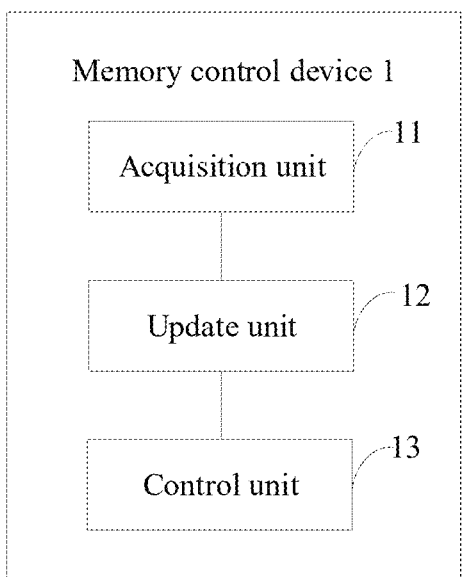
FIG. 3 illustrates a schematic structural diagram of a storage device control device according to some embodiments of the present disclosure.

The technical solutions of embodiments of the present disclosure are described in detail in connection with the accompanying drawings of embodiments of the present disclosure. The described embodiments are merely used to describe the present disclosure and not limit the present disclosure.

Embodiments of the present disclosure provide a memory control method. The memory control method can be applied to a memory control device. FIG. 1 illustrates a schematic flowchart of a storage device control method according to some embodiments of the present disclosure. As shown in FIG. 1, the memory control method includes the following processes.

At S101, data parameters in a read queue and a write queue are obtained. The data parameters correspond to a first detection result of a quantity of data in the read queue and a second detection result of a quantity of data in the write queue. The first detection result is related to a fullness state of the read queue, and the second detection result is related to a fullness state of the write queue.

The memory control method of embodiments of the present disclosure can be suitable for a scene of controlling the read and write operations of the memory.

Embodiments of the present disclosure, the memory control device can be implemented in various forms. For example, the memory control device of the present disclosure can include controllers, servers, and other devices. The specific memory control device can be determined according to the actual situation, which is not limited by embodiments of the present disclosure.

In embodiments of the present disclosure, the memory can include a DDR synchronous dynamic random-access memory chip, a dynamic random-access memory (DRAM), or other types of memory, which can be determined according to the actual situation and are not limited by embodiments of the present disclosure.

In embodiments of the present disclosure, the memory control device can obtain the data parameters in the read queue and write queue at a preset time. The preset time can be configured as time in the memory control device or time transmitted by another device to the memory control device. A specific manner of the memory control device obtaining the preset time can be determined according to the actual situation, which is not limited by embodiments of the present disclosure.

It should be noted that the preset time can be time points periodically obtained by setting specific time intervals based on an initial time. For example, a time interval can be added to the initial time to obtain a preset time. Two time intervals can be added to the initial time to obtain another preset time.

It should be noted that the preset time can be every minute, such as 21:45, 21:46, 21:47, etc. The preset time can also be every second, such as 15:16:01, 15:16:02, 15:16:03, etc. The preset time can also be other time periods. Specific time points of the preset time can be determined according to the actual situation, which is not limited in embodiments of the present disclosure.

In embodiments of the present disclosure, the read queue and write queue can refer to the read queue and the write queue of the memory. The memory control device can obtain the data parameters from the memory or other devices configured to store the data parameters. A specific manner of the memory control device obtaining the data parameters can be determined according to the actual situation, which is not limited by embodiments of the present disclosure.

In embodiments of the present disclosure, the data parameters can include the first detection result of the quantity of data in the read queue and the second detection result of the quantity of data in the write queue.

It should be noted that the first detection result can be a detection result of the fullness state of the read queue (e.g., the time length of the fullness states of two neighboring detection time intervals, or the number of occurrences of the fullness states between the two neighboring detection time intervals), a detection result when the quantity of data in the read queue reaches the preset quantity of data, or a detection result when the read queue is empty. The specific first detection result can be determined according to the actual situation, which is not limited by embodiments of the present disclosure.

It should be noted that the second detection result can be a detection result of the fullness state of the write queue (e.g., the time length of the fullness state between two neighboring detection time intervals or the number of occurrences of the fullness states of the two neighboring detection time intervals), a detection result when the quantity of data of the write queue reaches the preset quantity of data, or a detection result when the write queue is empty. The specific second detection result can be determined according to actual situations, which is not limited by embodiments of the present disclosure.

It should also be noted that the quantity of data value corresponding to the preset quantity of data can be ¾ or ¼ of the quantity of data in the fullness state. The quantity of data corresponding to the predetermined quantity of data can also be other values, which can be determined according to the actual situation and are not limited by embodiments of the present disclosure.

In embodiments of the present disclosure, before the memory control device obtains the data parameters in the read queue and the write queue, a fullness state detection can be performed on the read queue to obtain the first detection result, and a fullness state detection can be performed on the write queue to obtain the second detection result. The data parameters can be determined according to the first detection result and the second detection result.

In embodiments of the present disclosure, the process of the memory control device determining the data parameters according to the first detection result and the second detection results can include using the first detection result and the second detection result as the data parameters or adding the first detection result and the second detection result to the original data parameters to obtain the detection result.

In embodiments of the present disclosure, the method of the memory control device performing fullness state detection on the read queue and write queue can be the method in the existing technology, which is not described here.

At S102, a read/write control strategy is updated according to the first detection result and the second detection result to obtain an updated read/write control strategy.

In embodiments of the present disclosure, after obtaining the data parameters in the read queue and the write queue, the memory control device can update the read/write control strategy according to the first detection result and the second detection result to obtain the updated read/write control strategy.

In embodiments of the present disclosure, the read/write control strategy can include a strategy of performing controlling on the read operation or the write operation that is currently performed when the data parameters of the read queue and the write queue are obtained, that is, a last control strategy of the updated read/write control strategy.

In embodiments of the present disclosure, the process of the memory control device updating the read/write control strategy according to the first detection result and the second detection result to obtain the updated read/write control strategy can include determining a corresponding operation from the read operation and the write operation when the difference between the first detection result and the second detection result meets a preset condition, and updating the read/write control strategy according to the operation to obtain the updated read/write control strategy.

In embodiments of the present disclosure, the preset condition can include a threshold, i.e., the maximum value of the difference between the first detection result and the second detection result. When the read/write operation is performed with the system, a different degree between the read instructions that can be received and the read instructions that are expected to process, and a different degree between the write instructions and the write instructions that are expected to process.

When the first detection result is the time length of the fullness state of the read queue between the neighboring two detection time intervals, and the second detection result is the time length of the fullness state of the write queue between the neighboring two detection time intervals, the preset condition can be the maximum value of the acceptable differences between the time length of the fullness state of the read queue and the time length of the fullness state of the write queue. When the first detection result is the number of occurrences of the fullness states of the read queue within the neighboring two detection time intervals, and the second detection result is the number of occurrences of the fullness states of the write queue within the neighboring two detection time intervals, the preset conduction can be the maximum value of the acceptable differences between the number of occurrences of the fullness states of the read queue and the number of occurrences of the fullness states of the write queue.

If the preset condition is a threshold, an initial value can be set. The performance of the data reading and writing can be determined according to the initial value. The initial value can be adjusted until a value with which the performance of the data reading and writing is satisfied, i.e., the threshold.

In embodiments of the present disclosure, the preset condition can be a condition configured in the memory control device, a condition transmitted by another device to the memory control device, or a condition obtained by the memory control device in another method, which can be determined according to the actual situation and is not limited by embodiments of the present disclosure.

In embodiments of the present disclosure, the difference between the first detection result and the second detection result meeting the preset condition can include the difference between the first detection result and the second detection result being greater than or equal to the preset difference. The preset condition can include the preset difference.

In embodiments of the present disclosure, the process can also include determining the first difference between the first detection result and the threshold when the read queue is in the fullness state, determining the second difference between the second detection result and the threshold when the write queue is in the fullness state, and determining that the difference between the first detection result and the second detection result satisfying the preset condition when the difference between the first difference and the second difference is greater than or equal to the preset difference.

In embodiments of the present disclosure, the fullness state threshold of the read queue can be used to represent a processing state of the expected read instruction. The first difference between the first detection result and the fullness state threshold of the read queue can correspond to the deviation between the actual processing state of the read instruction and the expected processing state of the read instruction, i.e., the degree deviated from the read balanced state.

Similarly, the fullness state threshold of the write queue can be used to represent the expected processing state of the write instruction. The second difference between the second detection result and the fullness state threshold of the write queue can correspond to the deviation between the actual processing state of the write instruction and the expected processing state of the write instruction, i.e., the degree of deviating from the write balanced state.

In embodiments of the present disclosure, the difference between the first difference and the second difference can be used to represent the difference between the deviation degree of the read balance and the deviation degree of the write balance. In some embodiments, if (the first difference−the second difference)≥the preset difference, the deviation degree of the read balance can be much greater than the deviation degree of the write balance. Thus, the read balance state may need to be improved first, and subsequently use the read operation as the subsequent operation. If (the second difference−the first difference)≥the preset difference, the deviation degree of the write balance can be much greater than the deviation degree of the read balance. Thus, the write balance state may need to be improved first and subsequently use the write operation as the subsequent operation.

In embodiments of the present disclosure, the process of the memory control device can update the read/write control strategy according to the operation to obtain the updated read/write control strategy can include determining the initial operation corresponding to the current read/write control strategy, determining the updated read/write control strategy as switching the initial operation as the operation when the initial operation is different from the operation, and determining the updated read/write control strategy as remaining in the current initial operation when the initial operation is the same as the operation.

The initial operation can include the read operation or the write operation. That is, the initial operation can be the read operation or the write operation.

In embodiments of the present disclosure, the initial operation can be an operation when performing the control according to the read/write control strategy at the current moment, which can be the read operation or the write operation.

In embodiments of the present disclosure, if the initial operation is the read operation and the operation is the write operation, the initial operation can be different from the operation. In some other embodiments, when the initial operation is the write operation, and the operation is the read operation, the initial operation can be different from the operation.

In embodiments of the present disclosure, if the initial operation is a read operation and the operation is also a read operation, the initial operation and the operation can be the same. If the initial operation is a write operation, and the operation is also a write operation, the initial operation and the operation can be the same.

In embodiments of the present disclosure, the process of the memory control device determining the operation from the read operation and the write operation can include determining a target detection result with a largest detection result value from the first detection result and the second detection result and determining an operation corresponding to the target detection result as the preferred operation.

In embodiments of the present disclosure, the target detection result can be the first detection result or the second detection result. In some embodiments, if the first detection result is the detection result with the read queue in the fullness state, the second detection result is the detection result with the write queue in the fullness state, and the detection result value corresponding to the first detection result is greater than or equal to the detection result value corresponding to the second detection result, the target detection result can be the first detection result. If the first detection result is the detection result with the read queue in the fullness state, the second detection result is the detection result with the write queue in the fullness state, and the detection result value corresponding to the second detection result is greater than or equal to the detection result value corresponding to the first detection result, the target detection result can be the second detection result. If the first detection result is the detection result with the read queue in the empty state, the second detection result is the detection result with the write queue in the empty state, and the detection result value corresponding to the first detection result is greater than or equal to the detection result value corresponding to the second detection result, the target detection result can be the second detection result. If the first detection result is the detection result with the read queue in the empty state, the second detection result is the detection result with the write queue in the empty state, and the detection result value corresponding to the second detection result is greater than or equal to the detection result value corresponding to the first detection result, the target detection result can be the first detection result.

In embodiments of the present disclosure, the process of the memory control device determining the operation corresponding to the target detection result as the preferred operation can include when the target detection result is the first detection result, determining the preferred operation as the read operation, and when the target detection result is the second detection result, determining the preferred operation as the write operation.

In embodiments of the present disclosure, if the target detection result is the first detection result, the operation corresponding to the first detection result can be the read operation. That is, the read operation can be determined as the preferred operation. If the target detection result is the second detection result, the operation corresponding to the second detection result can be the write operation. That is, the write operation can be determined as the preferred operation.

In embodiments of the present disclosure, if the difference between the first detection result and the second detection result does not meet the preset condition, the updated read/write control strategy can be determined as remaining the initial operation corresponding to the read/write control strategy.

In embodiments of the present disclosure, when the difference between the first detection result and the second detection result does not meet the preset condition, the difference between the first detection result and the second detection result can be smaller than the preset difference.

In embodiments of the present disclosure, the process of the memory control device updating the read/write control strategy according to the first detection result and the second detection result to obtain the updated read/write control strategy can include determining the preferred operation according to the first detection result and the second detection result, obtaining the read/write operation environment parameters, and determining the updated read/write control strategy according to the read/write operation environment parameters and the preferred operation.

In embodiments of the present disclosure, determining the preferred operation according to the first detection result and the second detection result can include determining the corresponding preferred operation from the read operation and the write operation when the difference between the first detection result and the second detection result meets the preset condition.

In embodiments of the present disclosure, the read/write operation environment parameters can include the time length in the read operation or the write operation, the number of instructions of consecutive performing the read operation or the write operation, the strategy of whether performing the write operation or the read operation first with the other variables being the same, the tendency to the write operation when the write queue depth is greater than a certain threshold, and the comparison between the priority of the read operation instruction and the priority of the write operation instruction.

In embodiments of the present disclosure, the first operation can be determined according to the read/write operation environment parameters. A comprehensive determination can be performed according to the first operation and the preferred operation to determine the updated read/write control strategy.

In embodiments of the present disclosure, the process of the memory control device determining the updated read/write control strategy according to the read/write operation environment parameters, and the preferred operation can include determining the first operation according to the read/write operation environment parameters, and adjusting the first operation using the preferred operation to obtain the updated read/write control strategy.

In embodiments of the present disclosure, the method of determining the first operation according to the read/write operation environment parameters is the existing technology, which is not described here.

In embodiments of the present disclosure, the method of adjusting the first operation using the preferred operation can include replacing the first operation with the preferred operation to obtain the updated read/write control strategy.

At S103, the subsequent read/write operation of the memory is controlled according to the updated read/write control strategy.

In embodiments of the present disclosure, after the memory control device updates the read/write control strategy according to the first detection result and the second detection result to obtain the updated read/write control strategy, the memory control device can control the subsequent read/write operation of the memory according to the updated read/write control strategy.

In embodiments of the present disclosure, controlling the subsequent read/write operation of the memory according to the updated read/write control strategy can include when the updated read/write operation is determined, performing a switching process on the read/write operation according to the updated read/write control strategy, or performing the switching process on the read/write operation according to the updated read/write control strategy at the read/write switching moment, which can be determined according to the actual situation and is not limited in embodiments of the present disclosure.

In embodiments of the present disclosure, the read/write switching moment can include moment information configured in the memory control device or information transmitted from another device to the memory control device. The method of the memory control device obtaining the read/write switching moment can be determined according to the actual situation, which is not limited in embodiments of the present disclosure.

For example, as shown in FIG. 2, the first detection result of the quantity of data in the read queue and the second detection result of the quantity of data in the write queue are obtained. when the difference between the first detection result and the second detection result meets the preset condition (determination start), the target detection result with the largest detection result value can be determined from the first detection result and the second detection result. When the target detection result is the first detection result (the read queue fullness state statistic within the time interval between two neighboring detection times–the write queue fullness state statistic in the time interval between two neighboring detection times>=threshold), the preferred operation can be determined as the read operation (maintain or switch to the read direction). When the target detection result is the second detection result (the write queue fullness state statistic–the read queue fullness state statistic>=threshold), the preferred operation can be determined as the write operation (maintain or switch to the write direction). The initial operation corresponding to the read/write control strategy at the current moment can be determined. The initial operation can include a read operation or a write operation. When the initial operation is different from the preferred operation, the updated read/write control strategy can be determined as switching the initial operation to the preferred operation (switching to the read direction or the write direction). When the initial operation is the same as the preferred operation, the updated read/write control strategy can be determined as maintaining the current initial operation (maintaining the read direction or the write direction). The subsequent read/write operation of the memory can be controlled according to the updated read/write control strategy. When the difference between the first detection result and the second detection result does not meet the preset condition, the updated read/write control strategy can be determined as maintaining the initial operation corresponding to the read/write control strategy (this factor does not affect read/write switching).

By obtaining the data parameters in the read queue and the write queue, i.e., obtaining the first detection result of the quantity of data in the read queue and the second detection result of the quantity of data in the write queue, the memory control device can dynamically determine the updated read/write control strategy according to the first detection result and the second detection result detected according to the actual operations, and the read/write operation can be dynamically adjusted. That is, the read operation or the write operation can be appropriately enhanced to cause the ratio between the number of the read instructions performed by the DDR controller and the number of the read instructions that are expected to be processed and the ratio between the number of the write instructions performed by the DDR controller and the number of the write instructions that are expected to process to be balanced. Thus, reading and writing can be balanced in the actual dynamic scenes to improve the performance of data reading and writing.

Based on the same concept of the memory control method, embodiments of the present disclosure provide a memory control device 1 corresponding to the memory control method. FIG. 3 illustrates a schematic structural diagram of the memory device control device 1 according to some embodiments of the present disclosure. The memory control device 1 includes an acquisition unit 11, an update unit 12, and a control unit 13.

The acquisition unit 11 can be configured to obtain the data parameters in the read queue and the write queue. The data parameters can correspond to the first detection result of the quantity of data in the read queue and the second detection result of the quantity of data in the write queue. The first detection result can be related to the degree of fullness state of the read queue, and the second detection result can be related to the degree of fullness state of the write queue.

The update unit 12 can be configured to update the read/write control strategy according to the first detection result and the second detection result to obtain the updated read/write control strategy.

The control unit 13 can be configured to control the subsequent read and write operation of the memory according to the updated read/write control strategy.

In embodiments of the present disclosure, the device can further include a determination unit.

The determination unit can be configured to determine the corresponding preferred operation from the read operation and the write operation when the difference between the first detection result and the second detection result meets the preset condition.

The update unit 12 can be configured to update the read/write control strategy according to the preferred operation to obtain the updated read/write control strategy.

In embodiments of the present disclosure, the determination unit can be configured to determine the initial operation corresponding to the read/write control strategy at the current moment. The initial operation can include a read operation or a write operation. When the initial operation is different from the preferred operation, the updated read/write control strategy can be determined as switching the initial operation to the preferred operation. When the initial operation is the same as the preferred operation, the updated read/write control strategy can be determined as maintaining the current initial operation.

In embodiments of the present disclosure, the determination unit can be configured to determine the target detection result with the largest detection result value from the first detection result and the second detection result and determine the operation corresponding to the target detection result as the preferred operation.

In embodiments of the present disclosure, the determination unit can be configured to determine the updated read/write control strategy as maintaining the initial operation corresponding to the read/write control strategy when the difference between the first detection result and the second detection result does not meet the preset condition.

In embodiments of the present disclosure, the determination unit can be configured to determine the first difference between the first detection result and the read queue fullness state threshold, the second difference between the second detection result and the write queue fullness state threshold, and the corresponding preferred operation from the read operation and the write operation when the different between the first different and the second difference is greater than or equal to the preset difference.

In embodiments of the present disclosure, the determination unit can be configured to determine the preferred operation according to the first detection result and the second detection result, and the updated read/write control strategy according to the read/write operation environment parameters and the preferred operation.

The acquisition unit 11 can be configured to obtain the read/write operation environment parameters.

In embodiments of the present disclosure, the device can further include an adjustment unit.

The determination unit can be configured to determine the first operation according to the read/write operation environment parameters.

The adjustment unit can be configured to adjust the first operation using the preferred operation to obtain the updated read/write control strategy.

In embodiments of the present disclosure, the device can further include a detection unit.

The detection unit can be configured to perform a fullness state detection on the read queue to obtain the first detection result and perform a fullness state detection on the write queue to obtain the second detection result.

The determination unit can be configured to determine the data parameters according to the first detection result and the second detection result.

In practical applications, the acquisition unit 11, update unit 12, and control unit 13 can be implemented by a processor 14 of the memory control device 1. The processor 14 can include a central processing unit (CPU), a microprocessor unit (MPU), a digital signal processing (DSP), or a field programmable gate Array (FPGA), etc. The data storage can be realized by the first memory 15 of the memory control device 1.

Figure 4:
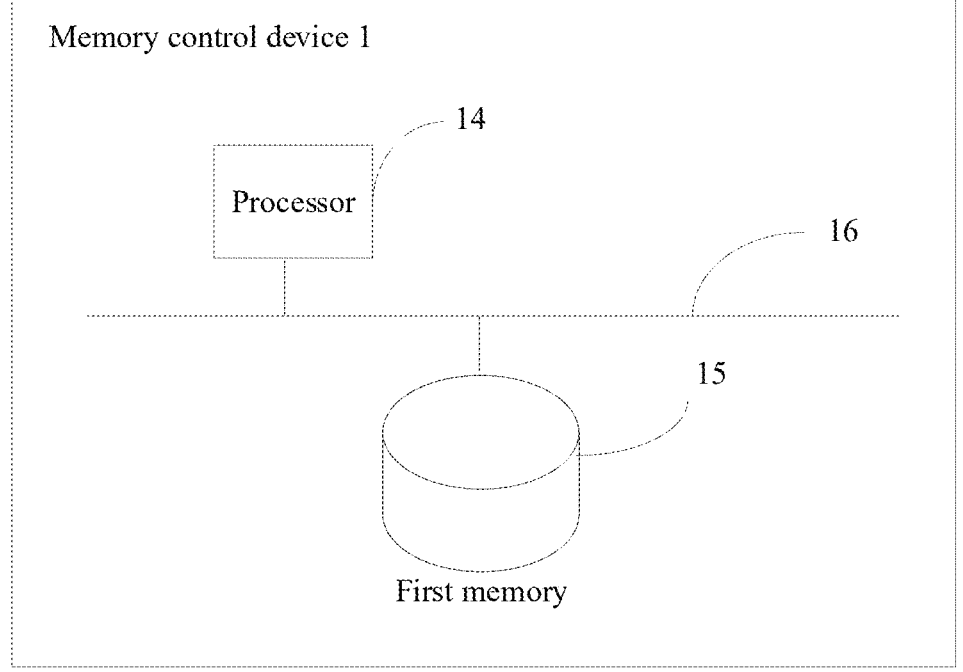
FIG. 4 illustrates a schematic structural diagram of a storage device control device according to some embodiments of the present disclosure.

Embodiments of the present disclosure also provide a memory control device 1. As shown in FIG. 4, the memory control device 1 includes a processor 14, a first memory 15, and a communication bus 16. The first memory 15 communicates with the processor 14 through the communication bus 16. The first memory 15 stores an executable program of the processor 14. When the program is executed, the processor 14 can perform the memory control method above.

In practical applications, the first memory 15 can be volatile memory, such as random-access memory (RAM), or non-volatile memory, such as read-only memory (ROM), flash memory, hard disk drive (HDD), or solid-state drive (SSD), or a combination thereof. The first memory 15 can provide instructions and data to the processor 14.

Embodiments of the present disclosure provide a computer-readable storage medium storing a computer program that, when executed by the processor 14, causes the processor 14 to perform the memory control method.

By obtaining the data parameters within the read queue and the write queue, i.e., obtaining the first detection result of the quantity of data in the read queue and the second detection result of the quantity of data in the write queue, the memory control device can dynamically determine the updated read/write control strategy according to the first detection result and the second detection result detected according to the actual operations, and dynamically adjust the read/write operation. That is, the read operation or the write operation can be appropriately enhanced to balance the ratio between the number of the read instructions performed by the DDR controller and the number of the read instructions that are expected to be processed and the ratio between the number of the write instructions performed by the DDR controller and the number of the write instructions that are expected to process. Thus, the reading and writing can be balanced in the dynamic actual scenes to improve the performance of the data reading and writing.

Those skilled in the art should understand that embodiments of the present disclosure can be provided as a method, system, or computer program product. Thus, the present disclosure can include hardware embodiments, software embodiments, or combinations thereof. In the present disclosure, a computer program product embedded in one or more computer-readable storage media (including not limited to magnetic disk storage device and optical storage device) including the computer program codes.

The present disclosure is described with reference to flowcharts and/or block diagrams of methods, devices (systems), and computer program products of embodiments of the present disclosure. Each process and/or block of the flowcharts and/or block diagrams and the combination of the processes and/or blocks of the flowcharts and/or the block diagrams can be implemented by the computer program instructions. The computer program instructions can be provided to a general-purpose computer, a special-purpose computer, an embedded processor, or a processor of another programmable data processing device to generate a machine. Thus, the instructions can be performed by the processor of the computer or the another programmable data processing device to generate an apparatus that is configured to realize one or more processes of the flowchart and/or one or more blocks of the block diagrams.

The computer program instructions can also be stored in a computer-readable memory that can direct the computer or the another programmable data processing device to operate in a particular manner. Thus, the instructions stored in the computer-readable memory can produce a manufactured product including an instruction device. The instruction device can be configured to realize the specified functions in one or more processes of the flowchart and/or one or more blocks of the block diagram.

The computer program instructions can also be loaded onto the computer or the another programmable data processing device to cause a series of operational steps to be performed on the computer or the another programmable device to generate a computer-implemented process. Thus, the instructions executed on the computer or the another programmable device can provide steps for implementing the functions specified in one or more processes of the flowcharts and/or one or more blocks of the block diagrams.

The above are merely embodiments of the present disclosure and are not used to limit the scope of the present disclosure.

What is claimed is:

1. A memory control method comprising:
obtaining data parameters in a read queue and a write queue, the data parameters corresponding to a first detection result of a quantity of data in the read queue and a second detection result of a quantity of data in the write queue, the first detection result being related to a degree of a fullness state of the read queue, and the second detection result being related to a degree of a fullness state of the write queue;
updating a read/write control strategy according to the first detection result and the second detection result to obtain an updated read/write control strategy, including:
a difference between the first detection result and the second detection result meets a preset condition;
in response to the difference between the first detection result and the second detection result meeting the preset condition, determining a preferred operation from a read operation and a write operation; and
updating the read/write control strategy according to the preferred operation to obtain the updated read/write control strategy; and
controlling subsequent read/write operations of a memory according to the updated read/write control strategy.

2. The method according to claim 1, wherein updating the read/write control strategy according to the preferred operation to obtain the updated read/write control strategy includes:
determining an initial operation corresponding to the read/write control strategy at a current moment, the initial operation including the read operation or the write operation;
in response to the initial operation being different from the preferred operation, determining the updated read/write control strategy as switching the initial operation to the preferred operation; and
in response to the initial operation being same as the preferred operation, determining the updated read/write control strategy as maintaining the current initial operation.

3. The method according to claim 1, wherein determining the preferred operation from the read operation and the write operation includes:
determining a target detection result with a largest detection result value from the first detection result and the second detection result; and determining an operation corresponding to the target detection result as the preferred operation.

4. The method according to claim 1, wherein in response to the difference between the first detection result and the second detection result meeting the preset condition, determining the preferred operation from the read operation and the write operation includes:

determining a first difference between the first detection result and a read queue fullness state threshold;

determining a second difference between the second detection result and a write queue fullness threshold; and in response to a difference between the first difference and the second difference being greater than or equal to a preset difference, determining the preferred operation from the read operation and the write operation.

5. The method according to claim 1, wherein updating of the read/write control strategy according to the first detection result and the second detection result to obtain the updated read/write control strategy further includes:

obtaining read/write operation environment parameters; and determining the updated read/write control strategy according to the read/write operation environment parameters and the preferred operation.

6. The method according to claim 5, wherein determining the updated read/write control strategy according to the read/write operation environment parameters and the preferred operation includes:

determining a first operation according to the read/write operation environment parameters; and adjusting the first operation using the preferred operation to obtain the updated read/write control strategy.

7. The method according to claim 1, further comprising, before obtaining the data parameters in the read queue and the write queue:

performing a fullness state detection on the read queue to obtain the first detection result;

performing a fullness state detection on the write queue to obtain the second detection result; and determining the data parameters according to the first detection result and the second detection result.

8. A memory control device comprising:

one or more processors; and one or more memories storing computer instructions that, when executed by the one or more processors, cause the one or more processors to:

obtain data parameters in a read queue and a write queue, the data parameters corresponding to a first detection result of a quantity of data in the read queue and a second detection result of a quantity of data in the write queue, the first detection result being related to a degree of a fullness state of the read queue, and the second detection result being related to a degree of a fullness state of the write queue;

update a read/write control strategy according to the first detection result and the second detection result to obtain an updated read/write control strategy, including:

in response to a difference between the first detection result and the second detection result meeting a preset condition, determining a preferred operation from a read operation and a write operation; and updating the read/write control strategy according to the preferred operation to obtain the updated read/write control strategy; and control subsequent read/write operations of a memory according to the updated read/write control strategy.

9. The method according to claim 8, wherein the one or more processors are configured to:

determine an initial operation corresponding to the read/write control strategy at a current moment, the initial operation including the read operation or the write operation;

in response to the initial operation being different from the preferred operation, determine the updated read/write control strategy as switching the initial operation to the preferred operation; and in response to the initial operation being same as the preferred operation, determine the updated read/write control strategy as maintaining the current initial operation.

10. The device according to claim 8, wherein the one or more processors are configured to:

determine a target detection result with a largest detection result value from the first detection result and the second detection result; and determine an operation corresponding to the target detection result as the preferred operation.

11. The device according to claim 8, wherein the one or more processors are configured to:

in response to the difference between the first detection result and the second detection result not meeting the preset condition, determine the updated read/write control strategy as maintaining an initial operation corresponding to the read/write control strategy, the initial operation including the read operation or the write operation.

12. The device according to claim 8, wherein the one or more processors are configured to:

determine a first difference between the first detection result and a read queue fullness state threshold;

determine a second difference between the second detection result and a write queue fullness threshold; and in response to a difference between the first difference and the second difference being greater than or equal to a preset difference, determine the preferred operation from the read operation and the write operation.

13. The device according to claim 8, wherein the one or more processors are configured to:

obtain read/write operation environment parameters; and determine the updated read/write control strategy according to the read/write operation environment parameters and the preferred operation.

14. The device according to claim 13, wherein the one or more processors are configured to:

determine a first operation according to the read/write operation environment parameters; and adjust the first operation using the preferred operation to obtain the updated read/write control strategy.

15. The device according to claim 8, wherein the one or more processors are configured to:

perform a fullness state detection on the read queue to obtain the first detection result;

perform a fullness state detection on the write queue to obtain the second detection result; and determine the data parameters according to the first detection result and the second detection result.

16. A non-transitory computer-readable storage medium storing a computer program that, when executed by one or more processors, causes the one or more processors to:

obtain data parameters in a read queue and a write queue, the data parameters corresponding to a first detection result of a quantity of data in the read queue and a second detection result of a quantity of data in the write queue, the first detection result being related to a degree of a fullness state of the read queue, and the second detection result being related to a degree of a fullness state of the write queue;

update a read/write control strategy according to the first detection result and the second detection result to obtain an updated read/write control strategy, including:

in response to a difference between the first detection result and the second detection result meeting a preset condition, determining a preferred operation from a read operation and a write operation; and updating the read/write control strategy according to the preferred operation to obtain the updated read/write control strategy; and control subsequent read/write operations of a memory according to the updated read/write control strategy.

* * * * *